United States Patent [19]

Paulucci

[11] Patent Number: 4,842,882

[45] Date of Patent: * Jun. 27, 1989

[54] METHOD OF MAKING DOUGH CRUST PRODUCT

[75] Inventor: Jeno F. Paulucci, Sanford, Fla.

[73] Assignee: The Pillsbury Co., Minneapolis, Minn.

[ * ] Notice: The portion of the term of this patent subsequent to Mar. 4, 2003 has been disclaimed.

[21] Appl. No.: 57,728

[22] Filed: Jun. 2, 1987

Related U.S. Application Data

[63] Continuation of Ser. No. 795,415, Nov. 6, 1985, abandoned, which is a continuation-in-part of Ser. No. 583,615, Feb. 27, 1984, Pat. No. 4,574,090.

[51] Int. Cl.$^4$ .............................................. A21D 8/00
[52] U.S. Cl. ...................................... 426/439; 426/94; 426/502; 426/523
[58] Field of Search ................... 426/89, 94, 95, 138, 426/283, 289, 302, 439, 440, 450, 496, 502, 523, 549, 18, 19, 27

[56] References Cited

U.S. PATENT DOCUMENTS

| | | | |
|---|---|---|---|
| 3,930,049 | 12/1975 | Mattson | 426/549 |
| 4,170,659 | 10/1979 | Totino et al. | 426/95 |
| 4,208,441 | 6/1980 | Westover | 426/302 |
| 4,273,791 | 6/1981 | Hanson et al. | 426/439 |
| 4,285,979 | 8/1981 | Izzi | 426/94 |
| 4,574,090 | 3/1986 | Paulucci | 426/439 |

*Primary Examiner*—Marianne Cintins

[57] ABSTRACT

An improved process for making dough crust in which docked dough pieces are cooked in multiple stages. Cooking can include an initial baking step in which the dough is essentially completely cooked and its interior structure substantially completely set, and a subsequent deep frying step which produces a crisp exterior and a desirable fried dough taste with substantially no change to the interior structure and only limited oil penetration. The multiple cooking steps can include a plurality of sequential baking steps in which the dough is baked at differing temperatures in each zone. The dough can be produced by a laminated process in which multiple layers of sheeted dough are layered one on top of the other with shortening therebetween, and cooked by a multiple zone oven having differing temperatures.

10 Claims, 3 Drawing Sheets

METHOD OF MAKING DOUGH CRUST PRODUCT

This application is a continuation, of application Ser. No. 795,415, filed Nov. 6, 1985, now abandoned which is a continuation-in-part of application Ser. No. 583,615, filed Feb. 27, 1984, now U.S. Pat. No. 4,574,090.

BACKGROUND OF THE INVENTION

This invention relates to processes of making dough products, and more particularly to an improved process for making dough crusts used for fresh or frozen pizzas or the like.

Processes for making crusts for pizza and other dough products include a cooking step, i.e., a step of baking or frying the dough. Examples of processes wherein such crusts are baked are found in Groth, U.S. Pat. No. 3,379,141 and Ruiz, U.S. Pat. No. 3,451,358. Examples of frying processes for such crusts are found in Totino et al., U.S. Pat. No. 4,170,659 and in the many cookbooks which describe so-called "Neopolitan" pizzas.

Westover, U.S. Pat. No. 4,208,441 discloses a pizza dough cooking process wherein the dough can be either baked or fried. Izzi, U.S. Pat. No. 4,285,979 discloses a pizza crust making process employing the steps of first frying and then baking the dough.

Many of these patents also describe the step of "docking" a dough sheet prior to the cooking process. In this step, the dough sheet is provided with spaced docking holes which extend completely through the dough sheet from top to bottom. The docking holes are intended to assist in allowing gas and moisture to be released during the cooking process and to fasten the top and bottom dough sheet surfaces together to prevent delamination between the upper and lower surfaces of the cooked pizza crust.

The prior processes described above have not always produced satisfactory crusts. The dough products formed by such prior processes, e.g., pizza crusts, have not always been characterized by crisp upper and lower dough surfaces with uniform, bready interiors, which is desirable. On the contrary, the crusts resulting from some prior processes which include a frying step often are grease laden, and many have a non-uniform internal structure containing relatively large pockets. Also, some cooked dough products made by prior processes tend to delaminate, all of which makes them unsatisfactory for use as a pizza dough, most notably a frozen pizza dough.

The present invention provides a dough forming process which produces a cooked dough crust having crisp upper and lower surfaces and a uniform, bready internal structure. The internal structure contains relatively small, uniform pores and no noticeable exterior blisters, and the upper and lower crust surfaces are bonded together in a manner which effectively resists delamination. The process is fast and efficient, and produces highly satisfactory results.

SUMMARY OF THE INVENTION

The present invention is directed to an improved process for making dough crust products particularly suited for pizzas, and more specifically, frozen pizzas, and results in a highly superior cooked crust which has crisp upper and lower surfaces, and a bready interior which has a substantially uniform pore structure substantially devoid of relatively large pockets. The crust produced by the process of the present invention resists delamination between the upper and lower surfaces.

A main feature of the invention is that cooking is carried out in multiple stages or steps. In one preferred embodiment, the cooking process includes a baking step during which the dough is essentially completely cooked so that its interior structure is substantially completely set. A deep frying step follows the initial baking step and produces a crisp exterior with substantially no change to the interior structure. The crust formed by the baking step resists oil penetration during the deep frying step so that only sufficient oil is absorbed to give a desirable fried dough taste.

In another embodiment of the invention, cooking is effected by multiple baking stages or steps. The temperature at each stage is controlled to effect uniform heating of the dough mass without burning, and the resulting crust has a crisp exterior and a uniform, bready interior.

In still another version of the invention, the dough product is formed by a laminated process in which multiple layers of sheeted dough are layered one on top of the other with shortening disposed therebetween. Multiple baking stages are used to cook the dough, and the resulting crust has a flaky, airy interior.

In all versions of the invention, the dough is docked prior to cooking. Thus, docking holes are formed through the dough from top to bottom. The subsequent multiple stage cooking process hardens the dough in the area of the docking holes and helps to join the upper and lower dough surfaces to prevent delamination of the dough.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the process of the present invention comprises the sequential steps of:

(a) producing a dough sheet having upper and lower surfaces;

(b) docking the dough sheet to provide a plurality of spaced-apart docking holes that extend through the dough sheet and connect the upper and lower dough surfaces;

(c) cutting the sheet into individual dough pieces;

(d) cooking each dough piece by sequential cooking steps, at least one of the cooking steps including a baking step, and the first cooking step being performed at a lower temperature than at least one of the subsequent cooking steps.

In one preferred embodiment, the sequential cooking steps include a relatively short initial baking step in which the docked dough is substantially completely cooked and its internal structure set, and a relatively short subsequent deep frying step.

The initial baking step is effective to cook the dough crust and render the crust surfaces somewhat resistant to oil penetration. Baking also seals the dough surface around the docking holes against substantial oil penetration, and hardens the dough in this area which helps join the upper and lower dough surfaces to prevent delamination of the dough. In the subsequent frying step, the crust absorbs only a small amount of oil to take on a fried taste.

It has been discovered that a lower protein flour can be used in a combined baked-fried crust than with fried crusts, for example. Low protein flour dough, when cooked, results in a crust with superior chewiness and without the toughness that results from using higher protein flour. The dough product is a delamination resistant crust of superior eating quality. It has a uniform bready interior texture, a fried outside appearance with no noticeable blisters, and a crisp top and bottom.

The thickness of the crust can be varied by varying proofing conditions. It can also be varied by varying the thickness of the original dough sheet.

After the frying step, the crust is cooled. Used in a frozen pizza, for example, the crust is then topped, frozen and packaged.

In another preferred embodiment, the dough is cooked in a multiple zone oven in which the docked dough passes through distinct baking zones in each of which the dough is baked for a relatively short period of time at a temperature different from the previous baking zone. The temperature at each baking zone is selected to effect even heating of the dough mass without burning.

In yet another preferred embodiment, raw dough is sheeted and layered with shortening between layers. After sheeting again, the dough is proofed in a high humidity environment, docked and then baked by passage through a multiple stage oven at differing temperatures. The cooked crust resulting from this embodiment has the desirably crisp upper and bottom surface and a flaky, airy interior.

The accompanying drawings, which are incorporated in and constitute a part of this specification, illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings.

The improved process of the present invention is utilized to produce improved dough products which can, inter alia, be prepared from low protein flour containing either yeast or chemical leavening. As will become apparent hereinafter, the formula may vary, and examples of preferred dough formulas are described below.

Figure 1:
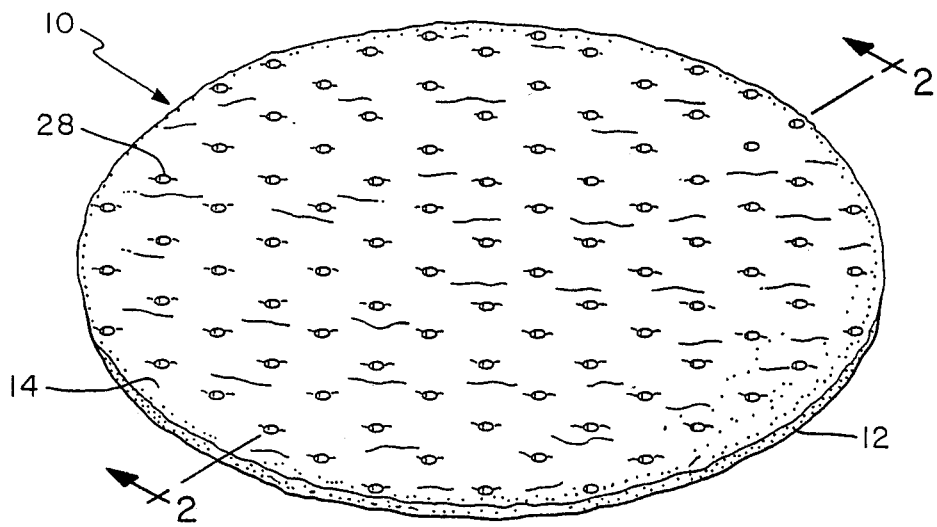
FIG. 1 is a perspective view of an improved dough product produced by the process of this invention.
Figure 2:
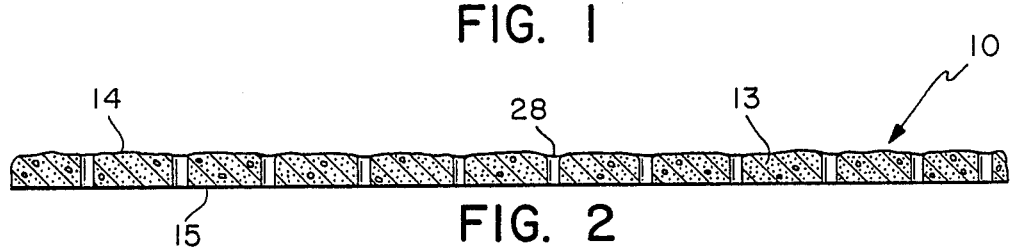
FIG. 2 is a sectional view taken along the line 2—2 thereof.

A pizza crust made by a preferred form of process of the present invention is illustrated generally at 11 in FIG. 1. The pizza crust 11 is nearly flat and, in this case, circular in shape. It is composed of a porous body 13 of cooked dough between top and bottom crust surfaces 15, 17.

The body 13 of dough is substantially uniform in texture. Its porous nature is such that a bready interior structure containing innumerable small pores 19.

The height of the finished crust 11 is determined primarily by the thickness of the sheeted dough, the moisture and yeast content of the dough, and the proofing time and temperature. Higher moisture and yeast content, as well as longer proofing, produces thicker crusts, for example.

The crust 11 is characterized by having a multiplicity of docking holes 21 which extend from the top surface 15 to the bottom surface 17. These holes 21 are a minimum of ⅛ inch in diameter and are spaced from about ¾" to 1¼" apart. The function of the docking holes is to prevent delamination of the crust and to allow gas and moisture to be released during the subsequent cooking process.

The dough surface through the docking holes 21 is exposed to direct heat during cooking. It becomes cooked fairly hard and creates a bond connecting the upper and lower surfaces 15, 17 and, in the embodiment which includes an initial baking step followed by a subsequent frying step, the baked dough surfaces seal the holes 21 against oil penetration. Depending upon the size of the docking holes and the particular parameters of the cooking process, the docking holes may remain open after the cooking process or they may become partially or completely closed. Nevertheless, the cooked hard dough surface at the docking holes effectively bonds the top and bottom dough surfaces 15, 17 together and prevents delamination.

The crust surfaces 15, 17 are quite dense and lack pores compared with the interior. It is preferred that they have a very light color but can, if desired, be cooked until substantially darker. The lighter colors are preferred for frozen pizzas since reheating can overcook or burn the crust if it is already a dark brown color.

Figure 3:
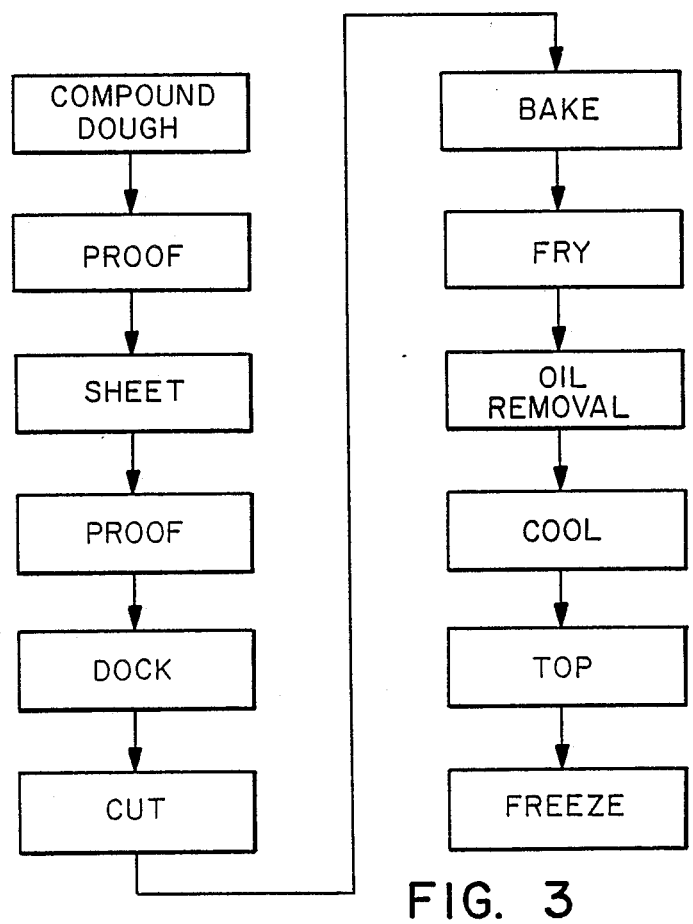
FIG. 3 is a flow chart illustrating the principal steps in a preferred process of the invention.

FIG. 3 is a flow chart illustrating a preferred process for practicing the invention. In the first step, dough is prepared. It has been discovered that a dough using low protein flour results in a crust having desired chewiness qualities, whereas dough made from high protein flour results in a tougher crust.

The dough is next extruded and sheeted. A short proof between extrusion and sheeting is desirable. The dough is sheeted down to the desired thickness, between 2 and 10 mm. The sheet is dusted with corn starch to prevent sticking on rollers and belts used for sheeting. The dough sheet is then proofed from 2½ to 15 minutes at 80°–110° F. at ambient humidity to allow the dough to rise further. After proofing, the dough sheet is docked by piercing it all the way through. The preferred spacing is from about ¾ inches to about 1¼ inches apart in both directions throughout the width and breadth of the sheet. The dough sheet is then cut into pieces of any desired shape.

In accordance with the invention, each dough piece is cooked by sequential steps, at least one of the cooking steps including a baking step, and the first cooking step being performed at a lower temperature than at least one of the subsequent cooking steps. In the preferred embodiment, the sequential cooking steps include a relatively short initial baking step in which the docked dough is substantially completely cooked and its internal structure set, and a relatively short subsequent deep frying step.

As embodied herein, the baking step is carried out in a multiple zone oven for 38 to 90 seconds. Preferably, there are at least four and up to six zones in the oven with differing temperatures ranging from about 250° F. to about 550° F. The partially cooked pizza crusts are moved from the oven immediately into a conventional submerging fryer for 8 to 18½ seconds at 390° F. to 415° F.

The initial baking step essentially completely cooks the dough and sets the internal structure thereof. The crust surfaces are hardened somewhat as is the dough surfaces through the docking holes. The subsequent frying step produces no substantial change to the internal dough structure. The cooked dough crust emerging from the initial baking step resists oil penetration. During the subsequent frying step, a small amount of oil, which is sufficient to give a desirable fried dough taste to the crust, is absorbed. Any excess oil on the crust surface is removed in the conventional manner after frying.

After frying and oil removal, the crust is cooled, either by letting it stand in the air or by passing it through a cooler. The latter procedure is preferred for large-scale production.

After cooking, the topping is applied in a well-known manner. The topped crust is then frozen and packaged.

The preferred embodiment of the invention will be understood more completely by reference to the following:

EXAMPLE 1

| 1. Dough Formula | Per Batch |
|---|---|
| Flour | 500.000 lbs. |
| Yeast Crumbles | 40.000 lbs. |
| Water (Variable) | 294.000 lbs. |
| Salt | 7.500 lbs. |
| Monocalcium Phosphate | 3.000 lbs. |
| Sodium Bicarbonate | 2.500 lbs. |
| Dextrose | 1.875 lbs. |
| Calcium Propionate | 1.500 lbs. |
| Whey | 1.400 lbs. |
| Sodium Stearoyl Lactylate | 1.250 lbs. |
| Succinylated monoglyceride and distilled monoglyceride | 0.250 lbs. |
| Soybean Oil | 2.500 lbs. |
| TOTAL | 855.775 lbs. |

2. Raw Materials
   A  Flour - low protein; produces doughs with less shrinkage and crusts having desired chewiness without toughness.
   Farinograph - Data based on 14.0% moisture flour

| Absorption | $56.5 \pm .1$ (%) |
   |---|---|
   | MTI | $35 \pm 5$ |
   | Mixing Tolerance | $9.0 \pm 1$ (min) |
   | Mix Peak | $6.5 \pm 1$ (min) |

Analytical

| Moisture | $13.0 \pm .5$ |
   |---|---|
   | Protein | 11.0 to 11.5 |
   | Ash | $.48 \pm .03$ |

B.  Yeast - the most critical ingredient in pizza crusts or bread leavened products is active in the fermentation (proof) time and initial onset of the baking
   C.  Salt - Enhances the flavor of the pizza crusts.
   D.  Monocalcium Phosphate - Chemical leavener used with 80 parts of sodium bicarbonate to neutralize pH - produces $CO_2$ which aids in leavening during baking.
   E.  Dextrose - Provides fermentable carbohydrates for yeast activity and aids in crust color development during baking.
   F.  Whey - Provides fermentable carbohydrates for yeast activity and browning of the crusts.
   G.  Sodium Stearoylate Lactylate (SSL) - Is highly functional in improving volume and more tender eating properties.
   H.  Succinylated Monoglyceride and Distilled Monoglyceride
   Reducing agent, dough conditioner aids in improving volume and eating qualities
   I.  Soybean Oil - Aids in lubrication to reduce sticking and aids in flow characteristics for uniformity of shape.

3. Dough Preparation
   Mixer - horizontal bar mixer.
   Mixer time - 7 minutes $\pm$ 1 minute at high speed for developing dough after 1 minute at low speed for mixing.
   Dough Temperature out of mixer - 68° F. to 72° F.
   Dough extruded onto 36 inch belt where it proofs as it travels to the first sheeting roller.

4. Sheeting
   Dough sheeted down to desired amount of dough per square inch in a series of 3 sheeting rollers
   Dough is dusted with corn starch on top and bottom to prevent sticking on rollers and belts.

5. Proofing
   Variable proofing time ranges from 2.5 minutes to 25 minutes.
   Proof temperature - 85° F. to 110° F.
   Humidity - 95% to 99% relative humidity.

6. Docking
   Dough docked with dockers which penetrate through the sheeted dough spaced ¾" apart - the docking holes prevent delamination of crusts during the cooking process.

7. Dough Cutting

| Crust Size | Cutter Size | Raw Wt. | Raw/wt. per Sq. In. | Finished Weight | Finished Wt. per Sq. In. |
|---|---|---|---|---|---|
| 12" | 13.0" | 10.5 Oz. | 0.791 | 9.7 Oz. | 0.805 |
| 10" | 10.85" | 8.0 Oz | 0.865 | 7.4 Oz. | 0.942 |
| 9.25" | 10.0" | 6.25 Oz. | 0.795 | 5.8 Oz | 0.863 |
| 8.25" | 9.0" | 5.5 Oz. | 0.865 | 5.0 Oz. | 0.930 |
| 2" | 2.2" | .292 Oz. | 0.601 | .229 Oz | 0.730 |

8. Baking
   - Jet Sweep oven
   - 48 feet long heating area
   - 6 Zones
   - 52 feet total length
   Bake Time - 38 to 90 seconds
   Oven Temperature - 250° F. to 550° F.

9. Frying
   - Deep fried in edible oil
   - Frying Time - 8 to 18.5 seconds
   - Frying Temperature - 390° F. to 415° F.

10. Cooling
    - through spiral cooler down to between 70° F.–90° F.

11. Finished Product Specifications
    Crust dimension - size $\pm$ .25 inches
    Crust weight - weight $\pm$ .2 ounces
    Crust moisture - 32% $\pm$ 4%
    Crust fat content - no higher than 10%
    Cooled temperature 80° F. $\pm$ 10° F.
    Crust height - .475 $\pm$ .025 inches

EXAMPLE 2

| | Per Batch |
|---|---|
| 1. Dough Formula | |
| Flour | 500.000 lbs. |

| | |
|---|---|
| Brew Slurry | 109.000 lbs. |
| Water (Variable) | 225.000 lbs. |
| Salt | 7.500 lbs. |
| Monocalcium Phosphate | 3.000 lbs. |
| Sodium Bicarbonate | 2.500 lbs. |
| Dextrose | 1.875 lbs. |
| Calcium Propionate | 1.500 lbs. |
| Whey | 1.400 lbs. |
| Sodium Stearoyl Lactylate | 1.250 lbs. |
| Succinylated monoglyceride and distilled monoglyceride | 0.250 lbs. |
| Soybean Oil | 2.500 lbs. |
| TOTAL | 855.775 lbs. |
| Brew Slurry | |
| Water | 60.00 lbs. |
| Yeast (fresh crumbles) | 40.00 lbs. |
| Dextrose | 8.50 lbs. |
| Buffer | 0.39 lbs. |
| Salt | 0.23 lbs. |
| Soybean Oil | 0.04 lbs. |
| | 109.16 lbs. |

2. Raw Materials

The raw materials analysis in this example is the same as in Example 1 above except that the flour analytical analysis includes a protein range of 9.5 to 9.8. Also, in this Example 2, it is noted that the purpose of the brew buffer is to control brew activity at optimum level for yeast activity (pH 4.8 to 5.3).

3. Dough Preparation

The same steps are followed in this Example as in Example 1 above except that the dough temperature out of the mixer in this Example 2 is 78° F. to 82° F.

4. Sheeting - Refer to Example 1 above.

5. Proofing

Variable proofing time ranges from 2.5 minutes to 15 minutes.
   Proof temperature - 85° F. to 110° F.
   Humidity - Ambient.

6. Docking

Refer to Example 1 above. Docking holes may be spaced 1¼" apart.

7. Dough Cutting - Refer to Example 1 above

8. Baking
   - Jet Sweep oven
   - 48 feet long heating area
   - 4 Zones
   - 52 feet total length
   Bake Time - 38 to 60 seconds
   Oven Temperature - 374° F. to 550° F.

9. Frying
   - Deep fried in edible oil
   - Frying Time - 13 to 18.5 seconds
   - Frying Temperature - 390° F. to 415° F.

10. Cooling - refer to Example 1 above.

11. Finished Product Specifications - refer to Example 1 above.

In accordance with the invention and as embodied herein in another form of the invention, cooking of the dough is carried out in a multiple zone oven in which the docked dough passes through distinct baking zones in each of which the dough is baked for a relatively short period of time at a temperature different from the previous baking zone. Preferably, sheeted dough, which has been proofed and docked, is delivered to a jet sweep, gas-fired oven which includes a plurality of distinct heating zones which may be individually temperature controlled. The dough passes from one zone of the oven to the next, and the temperatures and at each zone is controlled so as to effect uniform heating (and cooking) of the dough mass without burning. When the cooked dough emerges from the oven, it is appropriately cooled, after which topping is applied and the product frozen and packaged.

Figure 4:
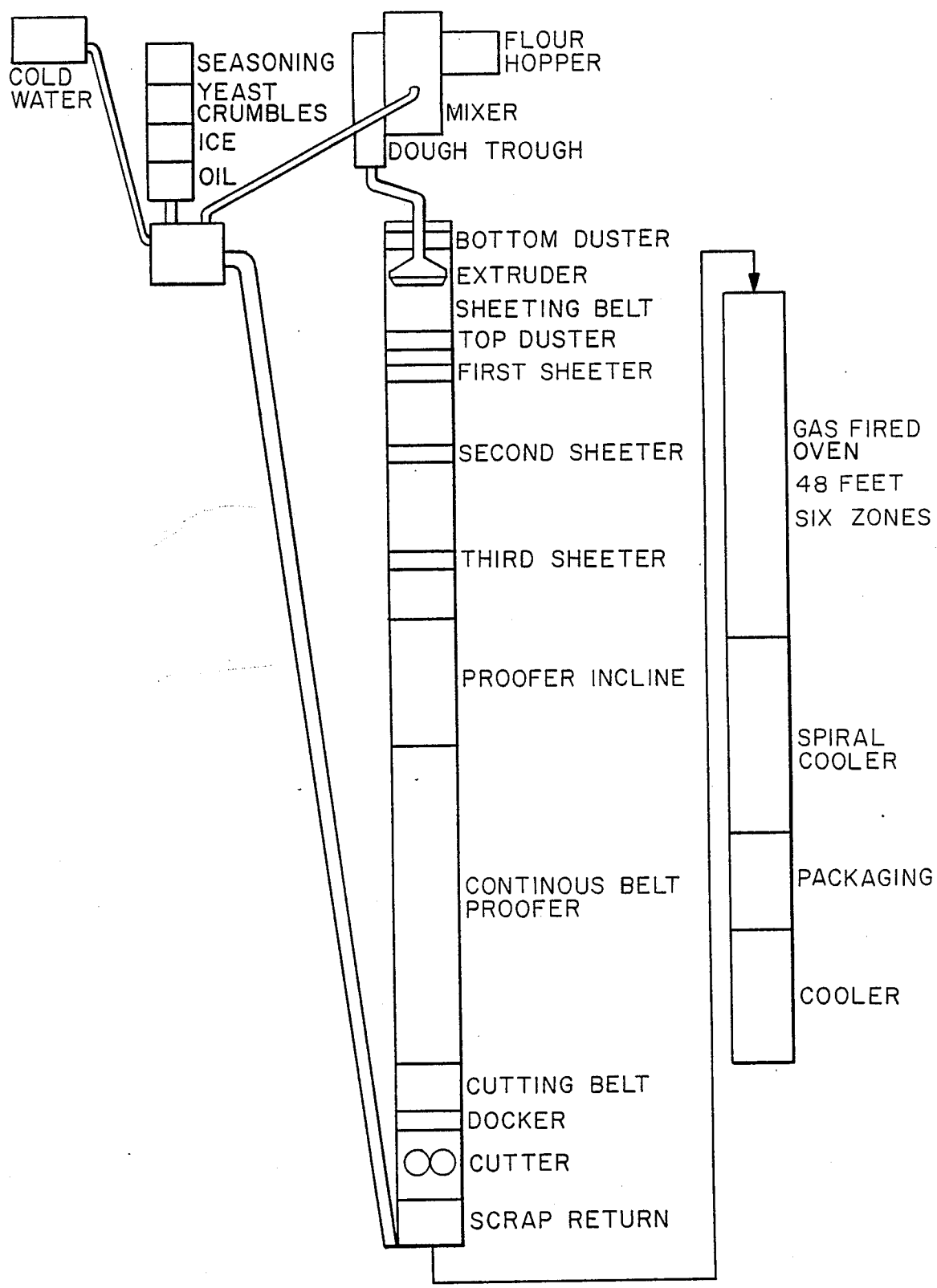
FIG. 4 is a flow chart illustrating the principal steps in another process according to the invention.

A flow chart illustrating this embodiment of the invention is shown in FIG. 4. Thus, all of the ingredients are added to a mixer to form the dough which, after mixing is complete, is dumped into an extruder trough. The dough is extruded onto a sheeting table and is dusted, both top and bottom prior to sheeting. Sheeting is carried out in three stages to obtain the desired thickness, and the dough sheet thereafter proofed on a proofing belt. The dough is then docked and cut and then delivered to a multi-zone, gas-fired oven. If appropriate, dough scrap from the cutting step is returned for use in forming subsequent dough.

After cooking, the dough is cooled in a spiral cooler, topped, frozen, and then packaged. Further storage of the frozen packaged product is in a cooler.

The following examples illustrate this embodiment of the invention.

EXAMPLE 3

| | | Per Batch |
|---|---|---|
| 1. | Dough Formula | |
| | Flour | 600.000 lbs. |
| | Ice | 40.000 lbs. |
| | Water (Variable) | 210.000 lbs. |
| | Yeast Crumbles | 70.000 lbs. |
| | Soybean Oil | 42.000 lbs. |
| | Crust Dough Seasoning | 34.800 lbs. |
| | Ascorbic Acid Tablets 30 p.p.m | 6 tabs. |
| | Potassium Bromate Tablets 60 p.p.m | 2 tabs. |
| | | 996.800 lbs. |
| 2. | Crust Dough Seasoning | |
| | Sugar | 24.000 lbs. |
| | Salt | 9.000 lbs. |
| | Calcium Propionate | 1.800 lbs. |
| | | 34.800 lbs. |

EXAMPLE 4

| | | Per Batch |
|---|---|---|
| 1. | Dough Formula | |
| | Flour | 300.000 lbs. |
| | Ice | 20.000 lbs. |
| | Yeast Crumbles | 35.000 lbs. |
| | Soybean Oil | 21.000 lbs. |
| | Crust Dough Seasoning | 17.400 lbs. |
| | Ascorbic Acid Tablets 30 p.p.m | 3 tabs. |
| | Potassium Bromate Tablets 60 p.p.m | 1 tabs. |
| | Liquified Scrap | 305.000 lbs. |
| | | 698.400 lbs. |
| 2. | Crust Dough Seasoning | |
| | Sugar | 12.000 lbs. |
| | Salt | 4.500 lbs. |
| | Calcium Propionate | 0.900 lbs. |
| | | 17.400 lbs. |

3. Dough Preparation (For Examples 3 and 4)
   Mixer - Horizontal Mixer
   Mixer Time - 1 minute on low speed, 7 minutes on high speed.
   Dough temperature out of Mixer - 64°-68° F.
   Dough extruded onto sheeting table, dusted lightly on top and bottom prior to placing on proofing belt.

4. Proofing - proof 15 to 25 minutes.

5. Docking - dough is docked with 1" pins spaced ¾" apart - the docking holes prevent delamination of crusts during the cooking process.

6. Baking - Jet Sweep Oven
   Zone 1 - 250°-275° F.
   Zone 2 - 250°-300° F.

-continued

```
Zone 3 - 325°-350° F.
Zone 4 - 350°-400° F.
Zone 5 - 400°-450° F.
Zone 6 - 500°-550° F.
Total time in oven - 3.5 minutes.
```
7. Cooling - crusts are cooled on refrigerated belts to 80° F. or below.
8. Finished Product Specifications

| Crust Size | Crust Weight | Crust Diameter | Crust Height | Moisture Content |
|---|---|---|---|---|
| 7" | 3.55-3.95 oz. | 6.75"-7.25" | .3"-.5" | 26%-30% |
| 9" | 5.4-5.8 oz. | 8.75"-9.25" | .3"-.5" | 30%-34% |
| 10" | 6.55-7.05 oz. | 9.75"-10.25" | .3"-.5" | 30%-34% |
| 12" | 11.1-11.5 oz. | 11.38"-11.78" | .4"-.6" | 30%-34% |

EXAMPLE 5

1. Dough Formula

| | Per Batch |
|---|---|
| Flour | 300.000 lbs. |
| Liquified Scrap | 305.000 lbs. |
| Yeast Crumbles | 22.500 lbs. |
| Seasoning | 18.000 lbs. |
| Soybean Oil | 9.000 lbs. |
| | 654.500 lbs. |

2. Crust Dough Seasoning

| | |
|---|---|
| Sugar | 11.862 lbs. |
| Salt | 4.500 lbs. |
| Calcium Propionate | 0.882 lbs. |
| Sodium Stearoyl Lactylate | 0.756 lbs. |
| | 18.000 lbs. |

3. Dough Preparation
   Mixer Time - 1 minute on low speed, 7 minutes on high speed
   Dough temperature out of Mixer - 64° F. to 68° F. Dough extruded onto sheeting table, dusted lightly on top with flour and on bottom with a 50/50 blend of corn meal and flour
4. Proofing - proof 6 to 10 minutes.
5. Docking - dough is docked with ¾" pins spaced inches apart - the docking holes prevent delamination of crusts during the cooking process.
6. Baking - Jet Sweep Oven
   ```
   Zone 1 - 325°-350° F.
   Zone 2 - 350°-375° F.
   Zone 3 - 475°-500° F.
   Zone 4 - 500°-525° F.
   Zone 5 - 550°-575° F.
   Zone 6 - 475°-500° F.
   Total time in oven - 3-3.33 minutes.
   ```
7. Cooling - crusts are cooled on refrigerated belts to 80° F. or below.
8. Finished Product Specifications
   Crust Size: 1.9"-2.1"
   Crust Weight: 6.0-7.0 grams
   Crust Moisture: 22%-24%
   Crusts are to be stored under refrigeration for a minimum of 24 hours prior to use in finished goods.

Figure 5:
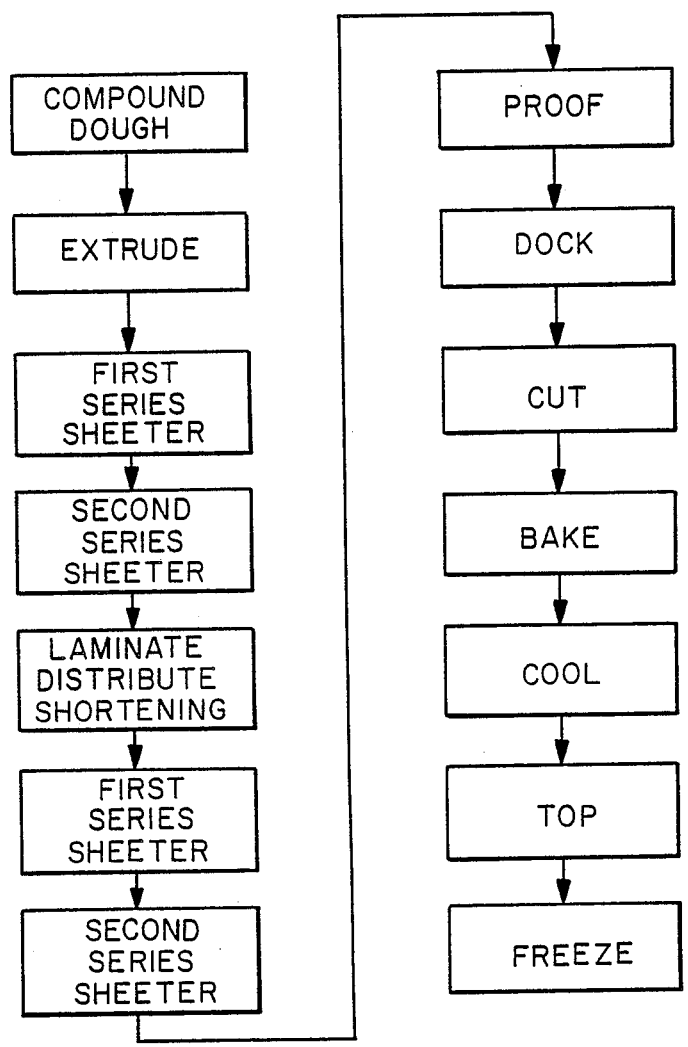
FIG. 5 is a flow chart illustrating the principal steps in still another process of the invention in which the dough is laminated.

In accordance with the invention and as embodied in still another version, a flow diagram for which is illustrated in FIG. 5, raw dough is sheeted and then layered with shortening between the layers. After sheeting again, the dough is proofed in a high humidity environment, docked, and then baked by passage through a plurality of distinct baking zones at different temperatures. The cooked crust has the desirably crisp upper and lower surfaces, and a flaky, airy interior. This form of the invention will be understood more completely by reference to the following:

EXAMPLE 6

1. Dough Formula

| | Per Batch |
|---|---|
| Flour | 200.000 lbs. |
| Yeast | 21.000 lbs. |
| Sugar | 4.000 lbs. |
| Salt | 2.000 lbs. |
| Calcium Propionate | 0.600 lbs. |
| Basic 604 | 0.500 lbs. |
| | 228.100 lbs. |

2. Process
   After mixing, the dough is extruded and then sheeted to the desired thickness. Dough sheets are then laminated with shortening flakes distributed between each of six layers. The layered mass is sheeted again using two sheeters in series to the desired thickness (a 10" diameter circle of dough will weight 245 grams ± 20 grams).
   The dough is proofed for 15 to 30 minutes at 95% to 99% relative humidity and at a temperature of 95°-110° F.
   The proofed dough is docked using 1" pins spaced ¾" apart, and then cut to size. Baking of the dough is carried out in a six-zone jet sweep oven. The zone temperatures are as follows:
   ```
   Zone 1 - 250°-275° F.
   Zone 2 - 280°-300° F.
   Zone 3 - 400°-425° F.
   Zone 4 - 475°-500° F.
   Zone 5 - 350°-375° F.
   Zone 6 - 250°-275° F.
   ```
   Total dwell time in the oven is from 3 to 4 minutes.
3. The Product
   The finished laminated pizza crust is characterized by a crisp upper and bottom surface with a flaky, airy interior. The internal structure comprises open cells ranging in size from ⅛" to ¼".

While the process embodiments described herein are the presently preferred embodiments, it should be understood that various additions, substitutions, modifications and omissions may be made thereto without departing from the scope of the invention. Thus, it is intended that the present invention encompass the additions, substitutions, modifications and omissions provided they fall within the true spirit and scope of the invention as defined by the appended claims.

What is claimed is:

1. A process of preparing a crust comprising the sequential steps of:
   (a) forming dough from flour and producing a dough sheet from said dough, said dough sheet having exterior upper and lower surfaces;
   (b) docking the dough sheet to provide a plurality of spaced-apart docking holes that extend through the dough sheet and connect the upper and lower dough surfaces;
   (c) cutting the dough sheet into individual dough pieces;
   (d) proofing said dough pieces prior to cooking said dough pieces; and
   (e) cooking each dough piece by sequential cooking steps, at least one of the cooking steps including a baking step, wherein the baking step is sufficient to set the interior structure of said dough piece and render the dough surfaces and the cooking side surfaces resistant to oil penetration and a subsequent frying step which is sufficient to crisp the exterior surfaces of the dough piece, said sequential cooking steps further forming cooked pieces having a bready interior and crisp exterior surfaces.

2. The process of claim 1, wherein:
(a) said docking holes are spaced apart from about ¾" to about 1¼".

3. The process of claim 1, wherein:
(a) said dough is baked in an oven at a temperature from about 250° F. to about 550° F. for from about 38 to about 90 seconds; and
(b) said dough is deep fried in edible oil at a temperature from about 390° F. to about 415° F. for from about 8 to about 18.5 seconds.

4. The process of claim 1, wherein:
(a) said dough is baked in a multiple zone oven having differing temperatures therein.

5. The process of claim 1, wherein:
(a) said dough is baked at a temperature from about 374° F. to about 550° F. for from about 38 to about 60 seconds; and
(b) said dough is deep fried in edible oil at a temperature from about 390° F. to about 415° F. and for from about 13 to about 18.5 seconds.

6. The process of claim 1, wherein said cooking steps include:
(a) passing said dough piece through a multiple zone baking oven so that the dough piece passes through distinct baking zones in each of which the dough is baked for a period of time at a temperature different from the previous baking zone; and
(b) the temperature at each baking zone being selected to effect even heating of the dough piece without burning.

7. The process of claim 6, wherein:
(a) said dough piece is baked in an oven having at least six distinct baking zones for a total time of about 3.5 minutes; and
(b) said baking zones having temperature ranges as follows:
zone 1—250° F.-275° F.
zone 2—250° F.-300° F.
zone 3—325° F.-350° F.
zone 4—350° F.-400° F.
zone 5—400° F.-450° F.
zone 6—500° F.-550° F.

8. The process of claim 4, wherein:
(a) said dough piece is baked in an oven having six temperature zones for from about 3 minutes to about 3 minutes 20 seconds; and
(b) the temperature ranges in said oven zones being as follows:
Zone 1—325° F.-350° F.
Zone 2—350° F.-375° F.
Zone 3—475° F.-500° F.
Zone 4—500° F.-525° F.
Zone 5—550° F.-575° F.
Zone 6—475° F.-500° F.

9. The process of claim 1, wherein the step of producing the sheet of dough includes:
(a) layering a plurality of raw dough sheets and providing shortening between the layers;
(b) sheeting the layered dough sheets thereby forming laminated dough.

10. The process of claim 1, wherein said proofed dough piece is baked by passage through an oven having at least six distinct baking zones; and wherein the temperature ranges in said baking zones are as follows:
Zone 1—250° F.-275° F.
Zone 2—280° F.-300° F.
Zone 3—400° F.-425° F.
Zone 4—475° F.-500° F.
Zone 5—350° F.-375° F.
Zone 6—250° F.-275° F.
and wherein the total dwell time in the oven for the dough piece is from about 3 to about 4 minutes.

* * * * *